(12) United States Patent
Kaneko et al.

(10) Patent No.: US 12,501,890 B2
(45) Date of Patent: Dec. 23, 2025

(54) REEL SEAT AND FISHING ROD

(71) Applicant: GLOBERIDE, Inc., Higashikurume (JP)

(72) Inventors: Kyoichi Kaneko, Higashikurume (JP); Yoshinao Kato, Higashikurume (JP); Masaru Akiba, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/873,897

(22) PCT Filed: Apr. 20, 2023

(86) PCT No.: PCT/JP2023/015742
§ 371 (c)(1),
(2) Date: Dec. 11, 2024

(87) PCT Pub. No.: WO2024/053152
PCT Pub. Date: Mar. 14, 2024

(65) Prior Publication Data
US 2025/0359539 A1      Nov. 27, 2025

(30) Foreign Application Priority Data
Sep. 6, 2022   (JP) ................. 2022-141707

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC ............................... A01K 87/06; A01K 87/08
See application file for complete search history.

(56) References Cited

U.S. PATENT DOCUMENTS

| 2,543,881 | A | * | 3/1951 | Umphlette | A01K 87/06 24/522 |
| 3,197,908 | A | * | 8/1965 | Hirsch | A01K 87/06 43/22 |
| 3,451,156 | A | * | 6/1969 | Barnes | A01K 87/08 43/22 |
| 3,616,563 | A | * | 11/1971 | Catignani | A01K 87/06 43/22 |

(Continued)

FOREIGN PATENT DOCUMENTS

| JP | S49-046557 Y2 | 12/1974 |
| JP | H02-174624 A | 7/1990 |

(Continued)

OTHER PUBLICATIONS

Jul. 18, 2023 Search Report issued in International Patent Application No. PCT/JP2023/015742.

*Primary Examiner* — Michael H Wang
(74) *Attorney, Agent, or Firm* — Oliff PLC

(57) ABSTRACT

A reel seat attached to a rod body includes: a main body including a reel leg placing portion, a fixed hood, and a tubular portion; a movable hood; and a cylindrical nut member. The reel seat is capable of fixing a reel to the reel seat by preventing a hand or a finger from touching an operating member for fixing a reel leg to the reel seat when the reel is gripped or during a casting operation, and a fishing rod including the same.

13 Claims, 12 Drawing Sheets

(56) References Cited

U.S. PATENT DOCUMENTS

| | | | | |
|---|---|---|---|---|
| 4,222,192 A * | 9/1980 | Jacobson | A01K 87/08 | 43/22 |
| 4,646,462 A * | 3/1987 | Ohmura | A01K 87/08 | 43/18.1 R |
| 4,653,217 A * | 3/1987 | Ohmura | A01K 87/06 | 43/22 |
| 5,048,223 A * | 9/1991 | Yamamoto | A01K 87/06 | 43/22 |
| 5,222,319 A * | 6/1993 | Yamato | A01K 87/06 | 43/22 |
| 5,481,820 A * | 1/1996 | Ohmura | A01K 87/06 | 43/22 |
| 5,537,773 A * | 7/1996 | Matsubara | A01K 87/08 | 43/22 |
| 5,904,000 A * | 5/1999 | Ohmura | A01K 87/06 | 43/22 |
| 6,067,740 A * | 5/2000 | Alley | A01K 87/06 | 43/22 |
| 6,105,301 A * | 8/2000 | Ohmura | A01K 87/06 | 43/22 |
| 6,393,754 B1 * | 5/2002 | Alley | A01K 87/06 | 43/22 |
| 7,159,355 B2 * | 1/2007 | Muroi | A01K 87/06 | 43/22 |
| 12,419,286 B2 * | 9/2025 | Omura | A01K 87/06 | |
| 2013/0283665 A1 * | 10/2013 | Poe | A01K 87/02 | 43/18.1 R |
| 2020/0187474 A1 * | 6/2020 | Webber | A01K 89/01925 | |
| 2023/0263146 A1 | 8/2023 | Kaneko et al. | | |
| 2024/0023529 A1 * | 1/2024 | Omura | A01K 87/06 | |

FOREIGN PATENT DOCUMENTS

| | | |
|---|---|---|
| JP | H04-012861 U | 1/1992 |
| JP | 2001-028976 A | 2/2001 |
| JP | 5517413 B2 | 6/2014 |
| JP | 2022-039168 A | 3/2022 |

\* cited by examiner

REEL SEAT AND FISHING ROD

CROSS REFERENCE

The present application claims priority based on Japanese Patent Application No. 2022-141707 (filed on Sep. 6, 2022), the contents of which are incorporated herein by reference in their entirety.

TECHNICAL FIELD

The present invention relates to a reel seat and a fishing rod comprising the same.

BACKGROUND ART

Conventionally, various fishing rods including a fishing rod reel seat have been known.

In such fishing rod, a fishing rod reel seat and a fishing rod grip are usually placed on a rod body, and a reel leg placing portion for placing a reel leg on an upper side or a lower side of a main body is formed on the fishing rod reel seat.

As the reel seat for such fishing rod, for example, as disclosed in Patent Literature 1, a reel seat (also referred to as an offset reel seat) in which a position of a reel leg placing portion of the reel seat is offset in a direction of falling down with respect to an axial center of a base rod is known. According to such offset reel seat, it is disclosed that, since the reel leg placing portion is shifted downward, at the time of attaching a round double-bearing reel, even though a grip portion on a rear side thereof is gripped, an operation position of the thumb does not become high, and it is possible to suppress deterioration in operability due to opening of the palm.

In addition, Patent Literature 2 discloses a reel support member of a fishing rod of a type including: a grip at a hand side end; and the reel support member that is set at a front end of the grip and includes a reel seat portion on which a reel is placed and supported and a rod holding portion that is provided at a front end of the reel seat portion and stores and holds a rear end of a rod. In the reel support member, the reel seat portion has a top surface including a portion that extends forward from a portion adjacent to the front end of the grip and supports the reel, and a bottom surface that has a cross-sectional shape to be at a lowest point at a substantially central portion and is curved upward toward both side edges of the top surface, the reel seat portion has a narrow portion at both ends in a front-rear direction and a wide portion at an intermediate portion thereof in plain view, the reel seat portion has an elliptical shape that is elongated in the front-rear direction as a whole, and in the wide portion, the reel support member substantially covers a bottom surface of the reel in a width direction of the reel.

CITATION LIST

Patent Literature

Patent Literature 1: JP 49-046557 U
Patent Literature 2: JP H2-174624 A

SUMMARY OF INVENTION

Technical Problem

However, even in the reel seat according to any of Patent Literatures, since the structure in which the position of the reel leg placing portion of the reel seat is offset in the direction of falling down with respect to the axial center of the base rod is adopted, there has been found a problem that a hand or a finger touches an operating member for fixing the reel leg to a seal sheet when the reel is gripped or during the casting operation, and the operating member is loosened or detached when the touching is repeated.

The present invention has been made in view of the above circumstances, and an object thereof is to provide a reel seat capable of stably maintaining a fixed state of a reel to the reel seat by preventing a hand or a finger from touching an operating member for fixing a reel leg to the reel seat when the reel is gripped or during a casting operation, even in a case where a structure in which a position of a reel leg placing portion of the reel seat is offset in a direction of falling down with respect to an axial center of a base rod is adopted, and a fishing rod including the same. Other objects of the present invention will become apparent upon reference to the entirety of the present specification.

Solution to Problem

A reel seat according to one embodiment of the present invention is a reel seat that is attached to a rod body, the reel seat comprising: a reel seat main body comprising a reel leg placing portion on which a reel leg is placed, a fixed hood provided on a front side in an axial direction of the reel leg placing portion, and a tubular portion provided on a rear side in the axial direction of the reel leg placing portion; a movable hood provided on the rear side in the axial direction of the reel leg placing portion; and a cylindrical nut member provided on an inner side of the tubular portion and enabling movement of the movable hood by rotation. In the reel seat, the movable hood comprises an engaging portion that is provided on an inner side of the tubular portion, and a hood portion that accommodates at least a part of the reel leg, the nut member comprises an operating part that protrudes outward in the axial direction from an end on the rear side in the axial direction of the tubular portion and operates a radially outer surface of the cylindrical nut member to enable rotation of the cylindrical nut member, an engaged portion that is provided to be relatively rotatable with respect to the tubular portion and has an inner surface or an outer surface seen in a radial direction of the cylindrical nut member engaging with the engaging portion, and a connecting portion that connects the operating part and the engaged portion, and the movable hood is movable to the front side in the axial direction by rotation of the nut member by operation of the operating part.

In the reel seat according to one embodiment of the present invention, the engaging portion and the nut member are screwed with each other.

In the reel seat according to one embodiment of the present invention, a grip portion is provided on an outer surface of the tubular portion.

In the reel seat according to one embodiment of the present invention, an end on the rear side in the axial direction of the grip portion is provided between the end on the rear side in the axial direction of the tubular portion and the operating part of the nut member as seen in the axial direction of the reel leg placing portion.

In the reel seat according to one embodiment of the present invention, the rod body can be inserted into the tubular portion from the rear side in the axial direction.

In the reel seat according to one embodiment of the present invention, a spacer member is provided between an inner surface of the nut member and an outer surface of the rod body.

In the reel seat according to one embodiment of the present invention, a stopper member is provided at an end on the rear side in the axial direction of the operating part of the nut member.

In the reel seat according to one embodiment of the present invention, in a state in which the rod body is inserted, the rod body, the engaged portion, and the tubular portion are provided in order from an inner side as seen in a downward direction from a central axis of the tubular portion in a cross section perpendicular to an axial direction of the reel leg placing portion.

In the reel seat according to one embodiment of the present invention, the engaging portion, the engaged portion, and the tubular portion are provided in order from an inner side as seen in a downward direction from a central axis of the tubular portion in a cross section perpendicular to an axial direction of the reel leg placing portion.

In the reel seat according to one embodiment of the present invention, the engaging portion is formed into an arc shape as seen in a cross section perpendicular to an axial direction of the reel leg placing portion.

In the reel seat according to one embodiment of the present invention, an angle of an arc of the arc shape ranges from 70 degrees to 140 degrees.

In the reel seat according to one embodiment of the present invention, the rod body is attached by being inserted through some or all of the reel seat. A fishing rod according to one embodiment of the present invention comprises the reel seat according to any one of the above descriptions; and a rod body.

Advantageous Effects of Invention

According to the above embodiment, it is possible to provide a reel seat capable of stably maintaining a fixed state of a reel to the reel seat by preventing a hand or a finger from touching an operating member for fixing a reel leg to the reel seat when the reel is gripped or during a casting operation, even in a case where a structure in which a position of a reel leg placing portion of the reel seat is offset in a direction of falling down with respect to an axial center of a base rod is adopted, and a fishing rod comprising the same.

DESCRIPTION OF EMBODIMENTS

Hereinafter, embodiments of a reel seat and a fishing rod according to the present invention will be specifically described with reference to the accompanying drawings. Components that are common in a plurality of drawings are denoted by the same reference signs throughout the plurality of drawings. It should be noted that each drawing is not necessarily drawn to an accurate scale for the sake of convenience in description.

Figure 1:
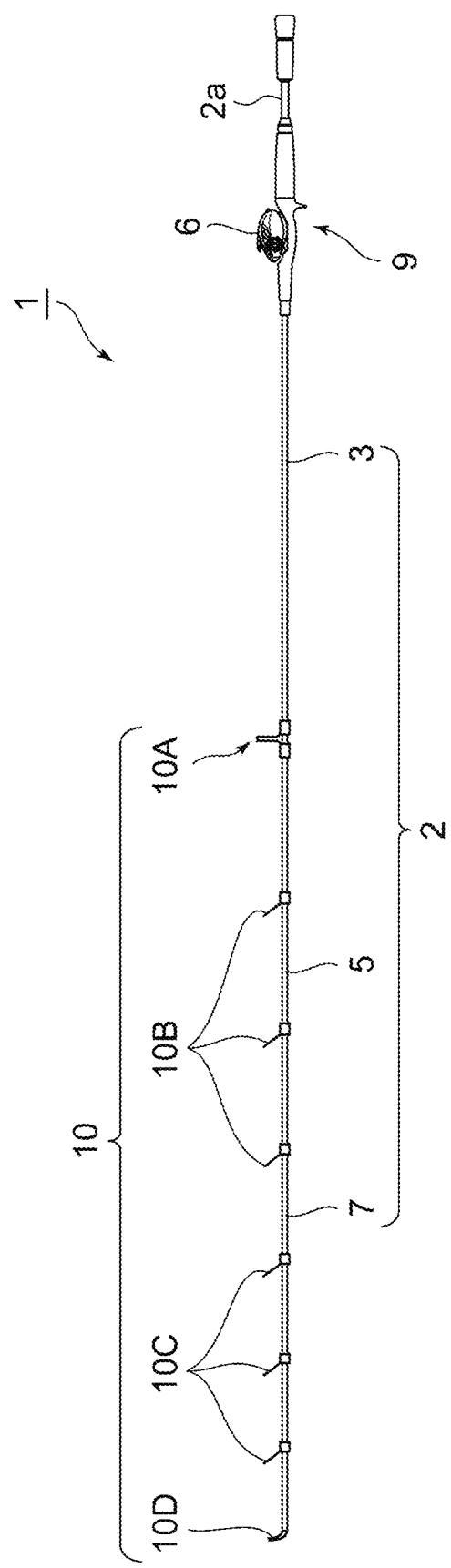
FIG. 1 is a view illustrating a fishing rod according to one embodiment of the present invention.

FIG. 1 is a view illustrating an embodiment of a fishing rod according to the present invention. As illustrated in the drawing, a fishing rod 1 according to the embodiment of the present invention comprises a rod body 2, a reel 6 attached to the rod body 2 via a reel seat 9, and a fishing line guide 10 attached to the rod body 2. In the illustrated embodiment, each of the reel seat 9 and the fishing line guide 10 corresponds to an attachment component attached to an outer peripheral surface of the rod body.

The rod body 2 is constituted by, for example, coupling a base rod 3, a middle rod 5, a tip rod 7, and the like to each other. These rod bodies are jointed to each other, for example, as an ordinarily jointed type. The base rod 3, the middle rod 5, and the tip rod 7 can be jointed to each other as a telescopic type, an inversely jointed type, a socket-and-spigot jointed type, or any other known jointed type. The rod body 2 may be formed of a single rod body.

Each of the base rod 3, the middle rod 5, and the tip rod 7 is formed of, for example, a tubular body made of a fiber-reinforced resin. This tubular body made of a fiber-reinforced resin is produced by winding a fiber-reinforced resin prepreg (prepreg sheet) obtained by impregnating reinforcing fibers with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. An outer surface of the tubular body is appropriately polished. Each of the rod bodies may be formed in a solid state.

In the illustrated embodiment, the base rod 3, the middle rod 5, and the tip rod 7 comprise a plurality of the fishing line guides 10 (fishing line guides 10A to 10D) for guiding a fishing line fed from the reel 6 attached to the reel seat 9. More specifically, the base rod 3 is provided with the fishing line guide 10A, the middle rod 5 is provided with the fishing line guide 10B, and the tip rod 7 is provided with the fishing line guide 10C. The tip rod 7 comprises the top guide 10D at a front end thereof, but details thereof are omitted.

Figure 2A:
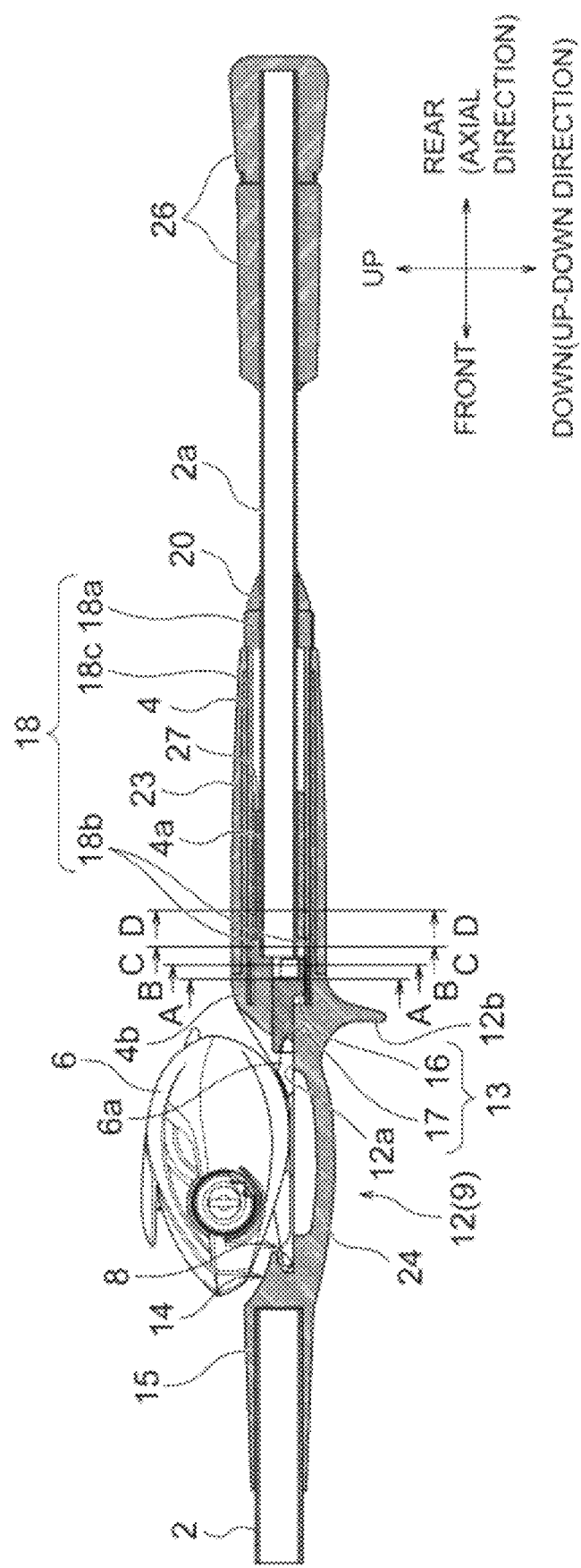
FIG. 2A is a cross-sectional view of a reel seat according to one embodiment of the present invention.
Figure 2B:
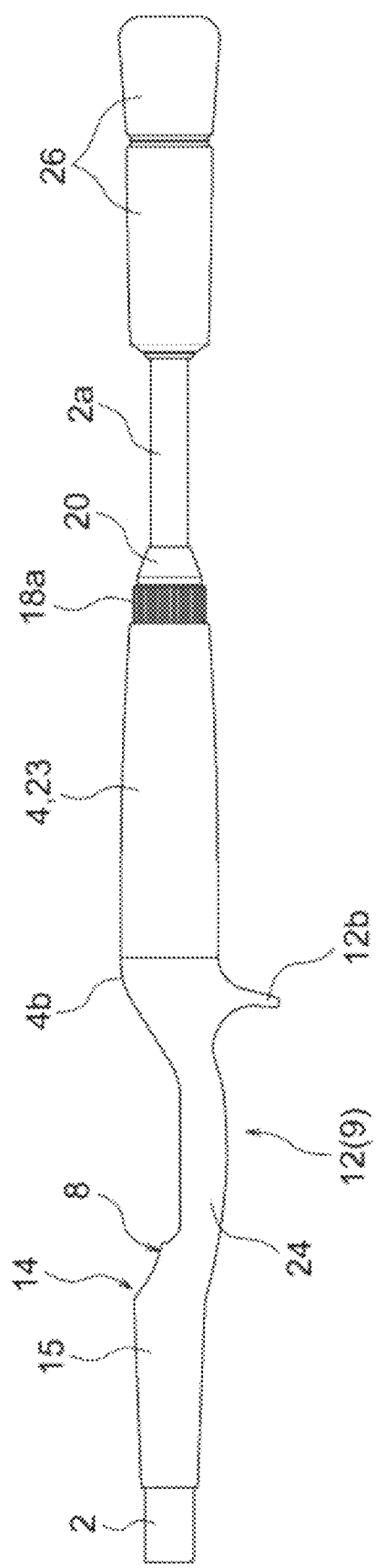
FIG. 2B is a front view of the reel seat according to one embodiment of the present invention.
Figure 3A:
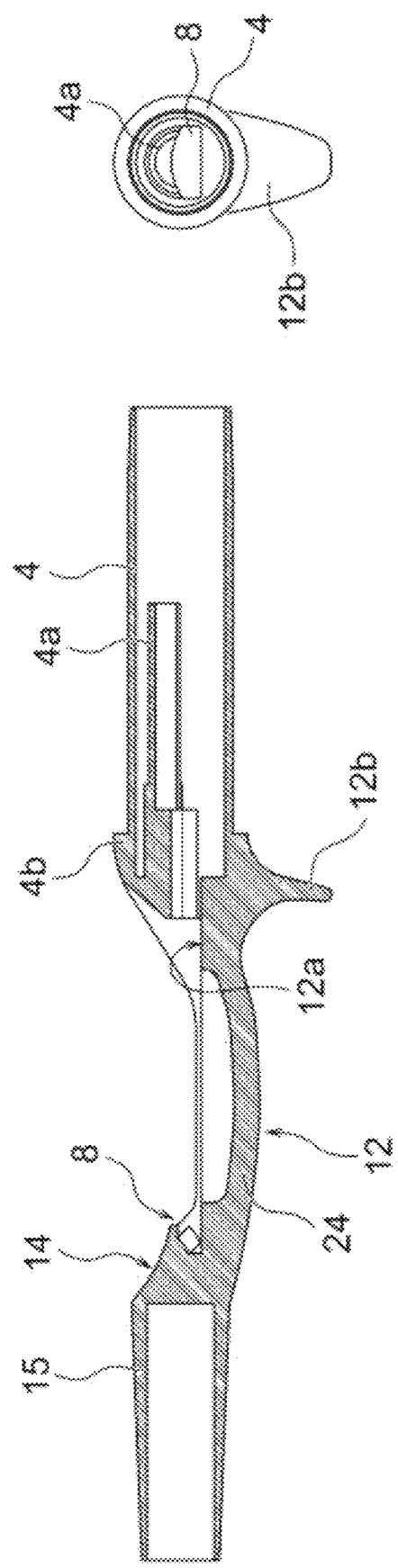
FIG. 3A illustrates a structure of a reel seat main body of the reel seat according to one embodiment of the present invention.
Figure 3B:
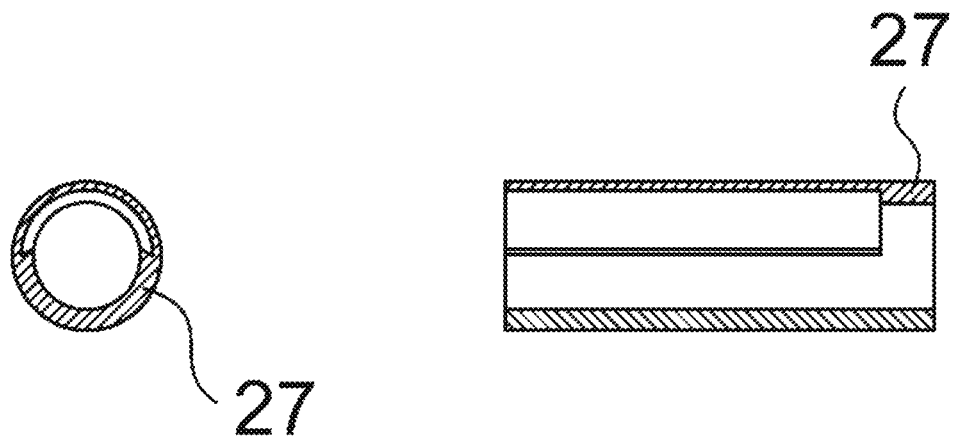
FIG. 3B illustrates a structure of a spacer member of the reel seat according to one embodiment of the present invention.
Figure 3C:
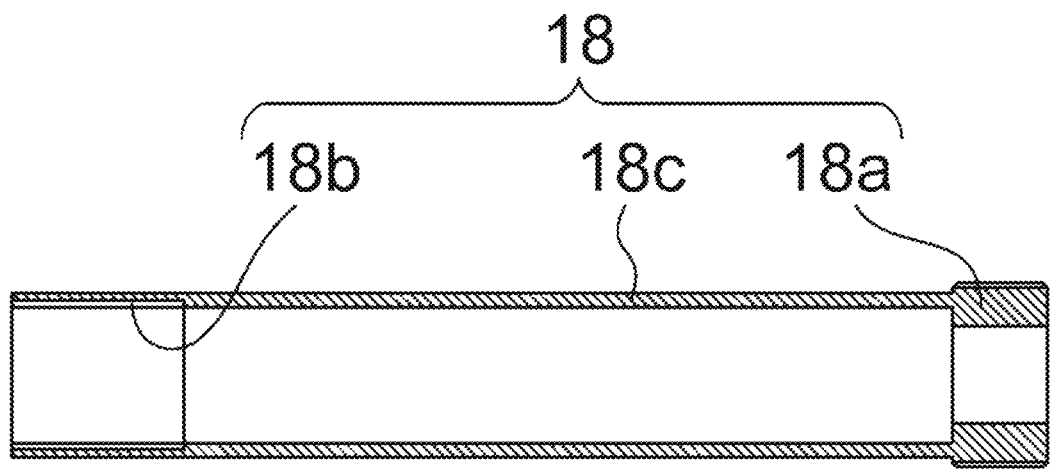
FIG. 3C illustrates a structure of a nut member of the reel seat according to one embodiment of the present invention.
Figure 3D:
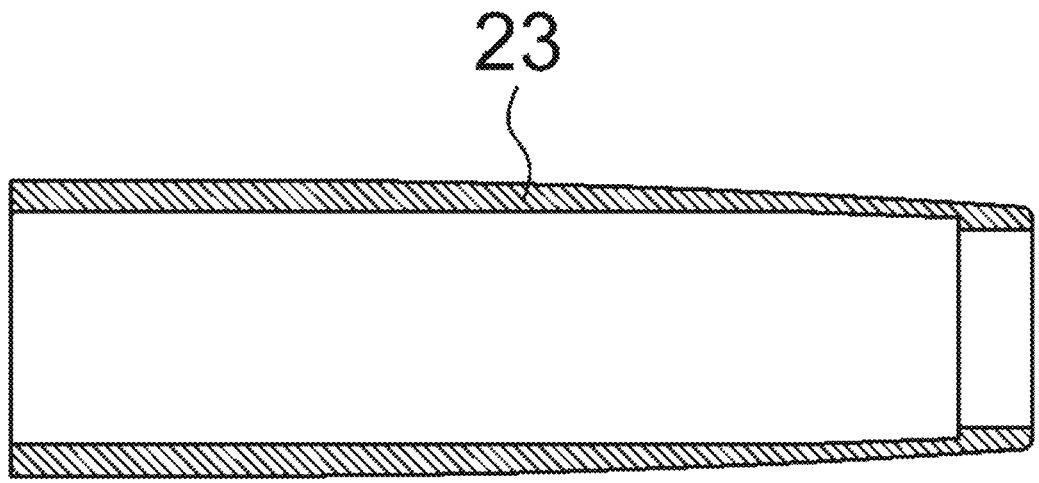
FIG. 3D illustrates a structure of a grip portion of the reel seat according to one embodiment of the present invention.

Next, a basic configuration of a reel seat main body 12 and the reel seat 9 will be described with reference to FIGS. 2 and 3. FIG. 2A is a cross-sectional view of the reel seat according to the embodiment of the present invention (a vertical cross-sectional view of a sheet surface of FIG. 2A passing through a central axis of the reel seat), and FIG. 2B is a front view of the reel seat according to the embodiment of the present invention. In the following description, an axial direction (front-rear direction) and an up-down direction mean directions illustrated in FIG. 2A and a right-left direction (side direction) mean a direction orthogonal to the sheet surface of FIG. 2A. That is, a front side and a rear side means a tip rod side and a proximal end side of the fishing rod, respectively, an upper side means a reel side with respect to an axial center X of a base rod (rod) when a double-bearing reel is attached, and a lower side means an opposite side of the reel side. The axial center X also corresponds to the axial center of the reel seat 9, the reel seat main body 12, the reel leg placing portion 12a, and the tubular portion 4, and these directions can be referred to as any of these axial directions. FIG. 3A illustrates a structure of the reel seat main body of the reel seat according to the embodiment of the present invention, FIG. 3B illustrates a structure of a spacer member of the reel seat according to the embodiment of the present invention, FIG. 3C illustrates a structure of a nut member of the reel seat according to the embodiment of the present invention, and FIG. 3D illustrates a structure of a grip portion of the reel seat according to the embodiment of the present invention.

The reel seat main body 12 comprises a reel leg placing surface 12a on which a reel leg 6a of the fishing reel 6 is placed in an axial direction thereof. The reel seat main body 12 can be formed to have a length ranging from 150 mm to 200 mm, for example, but is not limited thereto. In addition, the reel seat main body 12 forms a bulging portion (trigger) 12b that is a slightly bulged portion from the opposite side of the reel leg placing surface 12a and has an easy-to-grip curved outer surface that supports a thenar and an area near the thenar when gripped with a gripping hand. Note that, the rod body may be jointed on a front side of the reel seat main body 12.

The reel leg placing surface 12a of the reel seat main body 12 can be formed flat or substantially flat with a larger curvature than that of other sites in a circumferential direction (for example, the trigger 12b) adjacent to the reel leg placing surface 12a of the reel seat main body 12, and is formed to extend in the axial direction of the reel seat main body 12 illustrated in FIG. 2. A fixed hood 14 is integrally disposed on one end (rod tip side) of the reel seat main body 12. One end of the reel leg placing surface 12a of the reel seat main body 12 is disposed inside the fixed hood 14.

As will be described later in detail, a movable hood 13 is attached to the other end (rod base side) of the reel seat main body 12 so as to be movable in the axial direction. The fishing reel 6 is attached and fixed to the reel seat 9 by placing the reel leg 6a on the reel leg placing portion 12a and fastening a rear end side thereof by the movable hood 13 moving in the axial direction in a state in which a front end side thereof is fitted in the fixed hood 14. Note that, the reel seat 9 comprises the reel seat main body 12 and the movable hood 13, but may comprise other members.

The reel seat 9 according to one embodiment of the present invention will be described in more detail with reference to FIGS. 2 and 3 again. As illustrated in the drawing, the reel seat 9 according to one embodiment of the present invention is the reel seat 9 attached to the rod body (rod butt side rod body) 2a, the reel seat 9 comprising: the reel seat main body 12 comprising the reel leg placing portion 12a on which the reel leg 6a is placed, the fixed hood 14 provided on a front side (rod tip side) in the axial direction of the reel leg placing portion 12a (rod butt side), and the tubular portion 4 provided on a rear side (rod butt side) in the axial direction of the reel leg placing portion 12a; the movable hood 13 provided on the rear side (rod butt side) in the axial direction of the reel leg placing portion 12a; and a cylindrical nut member 18 provided on an inner side of the tubular portion 4 and enabling movement of the movable hood 13 by rotation. In the reel seat 9, the movable hood 13 comprises an engaging portion 16 that is provided on an inner side of the tubular portion 4, and a hood portion 17 that accommodates at least a part of the reel leg 6a, the nut member 18 comprises an operating part 18a that protrudes outward in the axial direction from an end on the rear side (rod butt side) in the axial direction of the tubular portion and operates a radially outer surface of the cylindrical nut member 18 to enable rotation of the cylindrical nut member 18, an engaged portion 18b that is provided to be relatively rotatable with respect to the tubular portion 4 and has an inner surface (example of FIGS. 2 and 3) or an outer surface (example of FIG. 9 to be described later) seen in a radial direction of the cylindrical nut member 18 engaging with the engaging portion 16, and a connecting portion 18c that connects the operating part 18a and the engaged portion 18b, and the movable hood 13 is movable to the front side (rod tip side) in the axial direction by rotation of the nut member 18 by operation of the operating part 18a. Here, in the reel seat 9 according to one embodiment of the present invention, the rod body 2 is attached by being inserted through some (example illustrated in FIGS. 2 and 3) or all (example illustrated in FIG. 9 to be described later) of the reel seat 9. Note that, a projection can be provided on an end of the rod body (rod butt side rod body) 2a. In this manner, it is possible to adopt a structure for preventing rotation by a shape of a base side end face portion of the rod body 2. A spacer may be used instead of the rod body (rod butt side rod body) 2a. In this case, for example, the rod body may be connected to the spacer by ordinary joint, or the rod body may be connected to the spacer by socket-and-spigot joint.

According to the reel seat according to one embodiment of the present invention, it is possible to provide a reel seat capable of stably maintaining a fixed state of a reel to the reel seat by preventing a hand or a finger from touching an operating member for fixing a reel leg to the reel seat when the reel is gripped or during a casting operation, even in a case where a structure in which a position of a reel leg placing portion of the reel seat is offset in a direction of falling down with respect to an axial center of a base rod is adopted. More specifically, the reel leg placing portion 12a and the operating part 18a can be formed sufficiently apart from each other by interposing the connecting portion 18c for providing a distance between the engaged portion 18b of the nut member 18 and the operating part 18a and providing the operating part 18a on the rod butt side of a grip portion (grip member) 23 to be described later, so that it is possible to maintain the fixed state of the reel 6 to the reel seat 9 for a long time by not touching the operating member for fixing the reel leg to the reel seat when the reel is gripped or during the casting operation with a hand or a finger or greatly reducing the possibility.

Next, the reel seat according to one embodiment of the present invention will be further described with reference to FIGS. 2 and 3. The reel seat main body 12 of the reel seat 9 comprises a front tubular portion 15 on a front side, and comprises the above-described tubular portion (rear tubular portion) 4 on a rear side, and a grip portion (rear grip) 23 to be gripped and held is fixed to an outer surface of the tubular portion 4. The reel seat main body 12 comprises an intermediate coupling portion 24 that couples the front tubular portion 15 and the tubular portion (rear tubular portion) 4 in the axial direction, and they are integrally formed. A proximal end side outer peripheral surface of the rod body 2 forming the fishing rod is fixed to the inner surface of the front tubular portion 15 by adhesion or the like, a proximal end side outer peripheral surface of the rod butt side rod body 2a forming the fishing rod is fixed to an inner surface of an inner projection 4a formed to protrude along the axial direction on the rear side of the reel seat main body 12 inside the tubular portion 4 by adhesion or the like, and the grip portion 23 is fixed to the outer peripheral surface of the tubular portion 4 and is configured to be flush with a surface of a tubular end 4b. In this case, the tubular end 4b is also a portion to be gripped and held together with the grip portion 23, and can form a grip. Note that, the configuration of the fishing rod 1 to which the reel seat 9 is fixed is not limited and may be a telescopic type, a jointed type, a single body type, and the like, and in FIG. 2, a part of the fishing rod (a part of the rod body) is illustrated, and an entire configuration is omitted. An example in which, a double-bearing reel (hereinafter, also referred to as a reel) of a low profile type is attached and fixed as the fishing reel 6 to the reel seat 9 is illustrated.

The movable hood 13 comprises the engaging portion 16 in which a male screw portion is formed, and the hood portion 17 curved radially inward to accommodate at least a part of the reel leg 6a. The hood portion 17 is disposed so as to enter an opening 8 formed below a rear end face of the intermediate coupling portion 24 (the vicinity of the tubular end 4b), and the opening 8 is connected to the reel leg placing portion 12a. That is, when the movable hood 13 moves forward, the hood portion 17 thereof is fitted in a rear end of the reel leg 6a placed on the reel leg placing portion 12a in the opening 8.

The male screw portion of the engaging portion 16 of the movable hood 13 is screwed with a female screw portion formed in the engaged portion 18b formed on an inner surface of the nut member 18 provided inside the tubular portion 4. That is, when the operating part 18a of the nut member 18 is rotationally operated in one direction, the movable hood 13 moves to the front side in the axial direction to fasten the rear end side of the reel leg 6a (attached and fixed state of the reel), and when the nut member 18 is rotationally operated in the other direction, the movable hood 13 moves to the rear side in the axial direction to release the rear end side of the reel leg 6a (detached state of the reel). Here, various methods known conventionally are possible as a method of engaging the engaging portion 16 with the engaged portion 18b, and the method is not limited to a specific mode (screwing). By providing a stopper member 20 on the rear end side of the operating part 18a, it is possible to restrict the operating part 18a so as not to come off to the rear side.

A grip portion (front grip) may be fixed to the outer surface of the front tubular portion 15, but the example illustrated in FIG. 2 illustrates a state where there is no grip portion. A rod butt side grip portion (rod butt side grip member) 26 is formed at a rod butt side end of the rod butt side rod body 2a.

In the reel seat 9 according to one embodiment of the present invention, the engaging portion 16 and the engaged portion 18b of the nut member 18 are screwed with each other.

In the reel seat 9 according to one embodiment of the present invention, the rod butt side rod body 2a is configured to be inserted or insertable into the tubular portion within a range from 70 mm to 100 mm as seen in the axial direction X of the tubular portion.

In the reel seat 9 according to one embodiment of the present invention, the rear-side end of the grip portion 23 seen in the axial direction of the reel seat 9 is provided between the rear-side end of the tubular portion 4 and the operating part 18a of the nut member 18 as seen in a coaxial direction.

In the reel seat 9 according to one embodiment of the present invention, the rod butt side rod body 2a can be inserted into the tubular portion 4 from the rear side in the axial direction.

In the reel seat 9 according to one embodiment of the present invention, the spacer member 27 is provided between the inner surface of the nut member 18 and the outer surface of the rod butt side rod body 2a.

In the reel seat 9 according to one embodiment of the present invention, the stopper member 20 is provided at the rear-side end of the operating part 18a of the nut member 18 as described above.

In the reel seat 9 according to one embodiment of the present invention, in a state in which the rod butt side rod body 2a is inserted, the rod body 2a, the engaged portion 18b, and the tubular portion 4 are provided in order from an inner side as seen in a downward direction from a central axis of the tubular portion 4 in a cross section perpendicular to an axial direction of the reel leg placing portion 12a.

In the reel seat 9 according to one embodiment of the present invention, the engaging portion 16, the engaged portion 18b, and the tubular portion 4 are provided in order from an inner side as seen in a downward direction from a central axis of the tubular portion 4 in a cross section perpendicular to an axial direction of the reel leg placing portion 12a.

Figure 4:
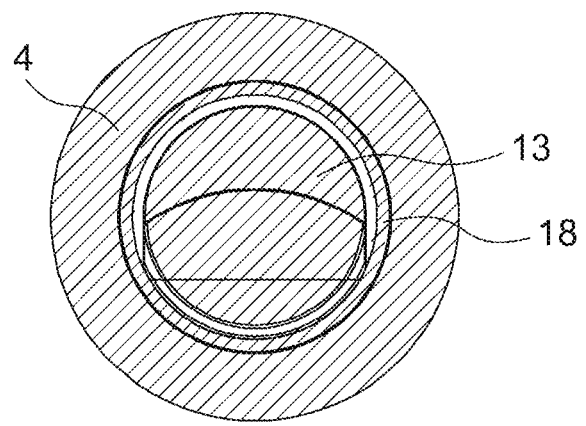
FIG. 4 is a cross-sectional view of the reel seat according to one embodiment of the present invention.

Next, a cross-sectional structure of the reel seat 9 according to one embodiment of the present invention will be described with reference to FIG. 4. FIG. 4 illustrates an A-A cross section of FIG. 2. As illustrated in the drawing, in the reel seat 9 according to one embodiment of the present invention, in a state in which the rod butt side rod body 2a is inserted (and in a case where the movable hood 13 is at the position of FIG. 2), an intermediate connecting portion 19 to be described later, the engaging portion 16, the engaged portion 18b, and the tubular end 4b are provided in order from the inner side when the cross section perpendicular to the axial direction of the tubular end 4b is seen in a downward direction from the central axis of the tubular end 4b (the downward direction in the up-down direction of the sheet surface of FIG. 4), and the intermediate connecting portion 19, the starting end of the inner projection 4a, the engaged portion 18b, and the tubular end 4b are provided in order from the inner side when the cross section perpendicular to the axial direction of the tubular end 4b is seen in an upward direction from the central axis of the tubular end 4b (the upward direction in the up-down direction of the sheet surface of FIG. 4). As illustrated in the drawing, the tubular end 4b of the reel seat main body 12 has a circular or substantially circular outer surface, and forms a space capable of accommodating the engaging portion 16 formed by curving therein. Various shapes of the inner side of the tubular end 4b are possible depending on the shape of the engaging portion 16, and are not limited to a specific mode.

Figure 5:
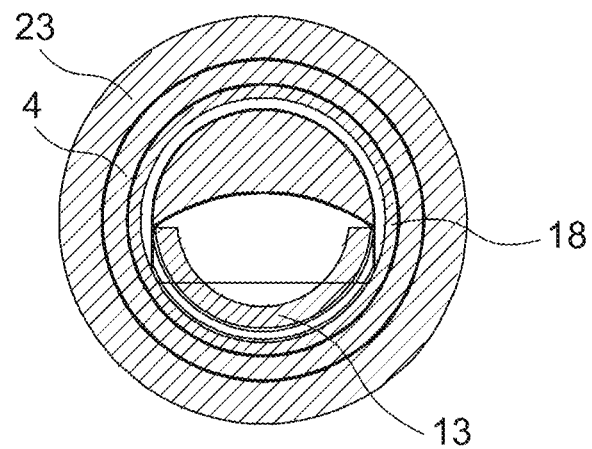
FIG. 5 is a cross-sectional view of the reel seat according to one embodiment of the present invention.

Next, a cross-sectional structure of the reel seat 9 according to one embodiment of the present invention will be described with reference to FIG. 5. FIG. 5 illustrates a B-B cross section of FIG. 2. As illustrated in the drawing, in the reel seat 9 according to one embodiment of the present invention, in a state in which the rod butt side rod body 2a is inserted (and in a case where the movable hood 13 is at the position of FIG. 2), the engaging portion 16, the engaged portion 18b, the tubular portion 4, and the grip portion 23 are provided in order from the inner side when the cross section perpendicular to the axial direction of the tubular portion 4 is seen in a downward direction from the central axis of the tubular portion 4 (the downward direction in the up-down direction of the sheet surface of FIG. 5), and the starting end of the inner projection 4a, the engaged portion 18b, the tubular portion 4, and the grip portion are provided in order when the cross section perpendicular to the axial direction of the tubular portion 4 is seen in an upward direction from the central axis of the tubular portion 4 (the upward direction in the up-down direction of the sheet surface of FIG. 5). As illustrated in the drawing, the tubular portion 4 of the reel seat main body 12 also has a circular or substantially circular outer surface, and forms a space capable of accommodating the engaging portion 16 formed by curving therein together with the tubular end 4b. Various shapes of the inner side of the tubular portion 4 are possible depending on the shape of the constituent member such as the engaging portion 16, and are not limited to a specific mode.

Figure 6:
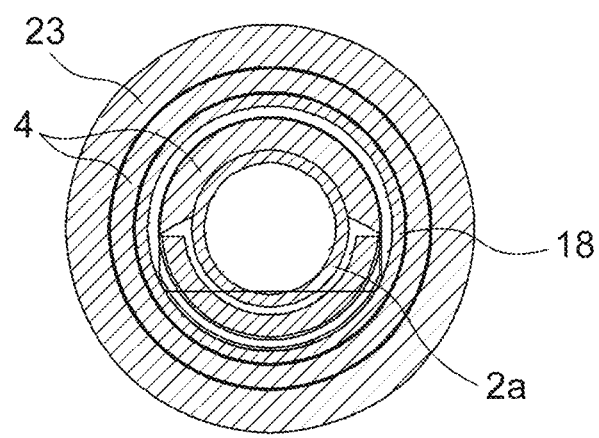
FIG. 6 is a cross-sectional view of the reel seat according to one embodiment of the present invention.

Next, a cross-sectional structure of the reel seat 9 according to one embodiment of the present invention will be described with reference to FIG. 6. FIG. 6 illustrates a C-C cross section of FIG. 2. As illustrated in the drawing, in the reel seat 9 according to one embodiment of the present invention, in a state in which the rod butt side rod body 2a is inserted (and in a case where the movable hood 13 is at the position of FIG. 2), the rod butt side rod body 2a, the engaged portion 18b, the tubular portion 4, and the grip portion 23 are provided in order from the inner side when the cross section perpendicular to the axial direction of the tubular portion 4 is seen in a downward direction from the central axis of the tubular portion 4 (the downward direction in the up-down direction of the sheet surface of FIG. 6), and the rod butt side rod body 2a, the inner projection 4a, the engaged portion 18b, the tubular portion 4, and the grip portion 23 are provided in order when the cross section perpendicular to the axial direction of the tubular portion 4 is seen in an upward direction from the central axis of the tubular portion 4 (the upward direction in the up-down direction of the sheet surface of FIG. 6). As illustrated in the drawing, the tubular portion 4 of the reel seat main body 12 also has a circular or substantially circular outer surface, and forms a space capable of accommodating the rod butt side rod body 2a. The shape of the inner side of the tubular portion 4 is a cylindrical shape, and various shapes of the inner side of the tubular portion 4 are possible depending on the shapes of the constituent members such as the rod butt side rod body 2a, the nut member 18, and the spacer member 27, and are not limited to a specific mode.

Figure 7:
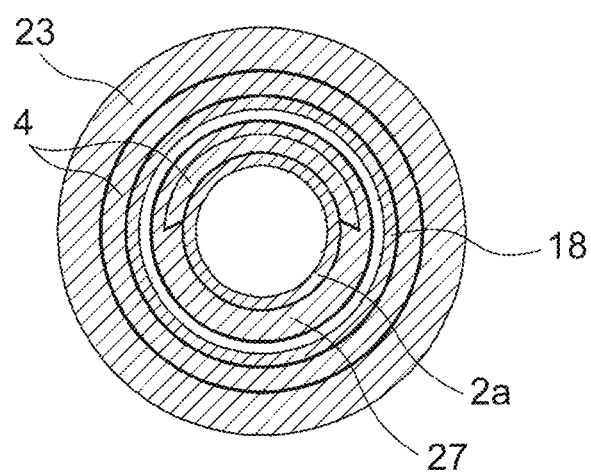
FIG. 7 is a cross-sectional view of the reel seat according to one embodiment of the present invention.

Next, a cross-sectional structure of the reel seat 9 according to one embodiment of the present invention will be described with reference to FIG. 7. FIG. 7 illustrates a D-D cross section of FIG. 2. As illustrated in the drawing, in the reel seat 9 according to one embodiment of the present invention, in a state in which the rod butt side rod body 2a is inserted (and in a case where the movable hood 13 is at the position of FIG. 2), the rod butt side rod body 2a, the spacer member 27, the connecting portion 18c of the nut member 18, the tubular portion 4, and the grip portion 23 are provided in order from the inner side when the cross section perpendicular to the axial direction of the tubular portion 4 is seen in a downward direction from the central axis of the tubular portion 4 (the downward direction in the up-down direction of the sheet surface of FIG. 7), and the rod butt side rod body 2a, the inner projection 4a, the spacer member 27, the connecting portion 18c of the nut member 18, the tubular portion 4, and the grip portion 23 are provided in order when the cross section perpendicular to the axial direction of the tubular portion 4 is seen in an upward direction from the central axis of the tubular portion 4 (the upward direction in the up-down direction of the sheet surface of FIG. 7). As illustrated in the drawing, the tubular portion 4 of the reel seat main body 12 also has a circular or substantially circular outer surface, and forms a space capable of accommodating the rod butt side rod body 2a. The shape of the inner side of the tubular portion 4 is a cylindrical shape, and various shapes of the inner side of the tubular portion 4 are possible depending on the shapes of the constituent members such as the rod butt side rod body 2a, the nut member 18, and the spacer member 27, and are not limited to a specific mode.

Figure 8A:
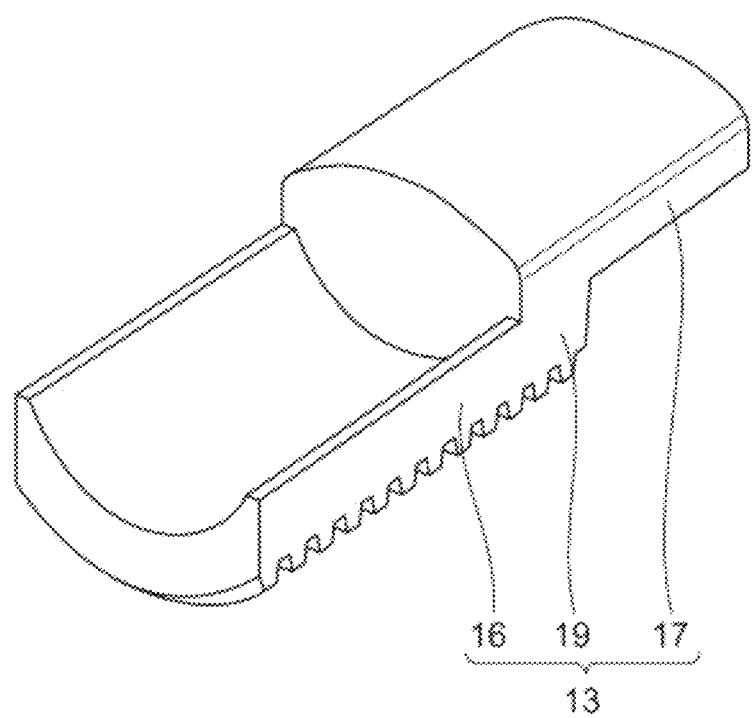
FIG. 8A is an upward perspective view of a movable hood in the reel seat according to one embodiment of the present invention.
Figure 8B:
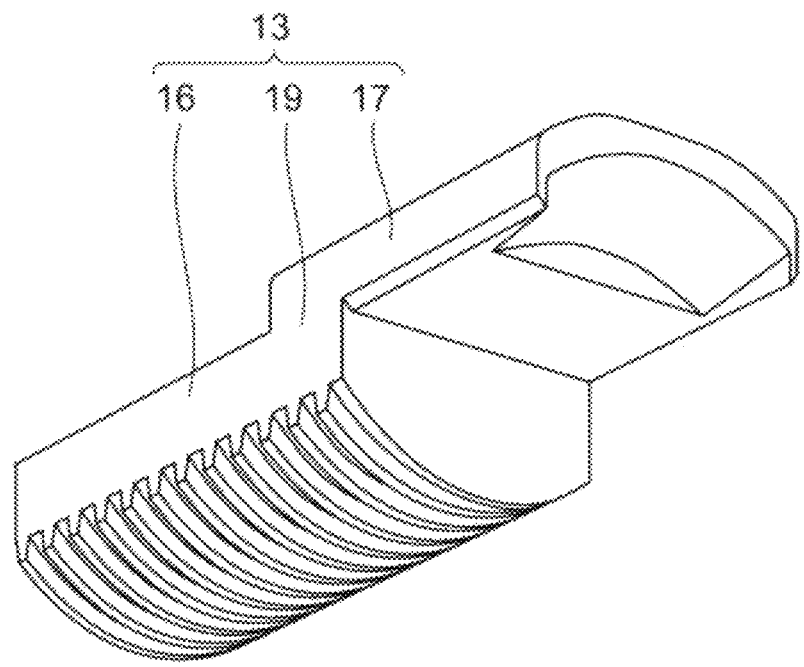
FIG. 8B is a downward perspective view of the movable hood in the reel seat according to one embodiment of the present invention.

Next, a structure of the movable hood 13 in the reel seat 9 according to one embodiment of the present invention will be described with reference to FIG. 8. FIGS. 8(a) and 8(b) are perspective views (the former is seen from obliquely above, and the latter is seen from obliquely below). As illustrated in the drawings, the movable hood 13 comprises the engaging portion 16 and the hood portion 17, and the engaging portion 16 is formed into an arc shape or a curved shape as seen in the cross section (cross section illustrated in FIG. 4) perpendicular to the axial direction of the tubular portion 15. In this manner, the male screw portion of the engaging portion 16 provided on the outer surface can be screwed with the female screw portion formed on the engaged portion 18b on the inner surface of the nut member 18. The engaging portion 16 of the movable hood 13 is formed into an arc shape having an angle ranging from 70 degrees to 140 degrees.

As illustrated in FIG. 6, in the movable hood 13 in the reel seat 9 according to one embodiment of the present invention, the engaging portion 16 and the hood portion 17 are offset from each other as seen in a radial direction of the central axis of the reel seat 9 (the hood portion 17 is formed inside the engaging portion 16 as seen in the radial direction of the central axis of the reel seat 9). In a case where the engaging portion 16 and the hood portion 17 are offset, the intermediate connecting portion 19 extending perpendicularly to the central axis of the reel seat 9 and connecting the engaging portion 16 and the hood portion 17 is provided between the engaging portion 16 and the hood portion 17. In this manner, by adjusting the length of the intermediate connecting portion 19, the rod butt side rod body 2a can be inserted to the deeper side of the tubular portion 4.

Figure 9A:
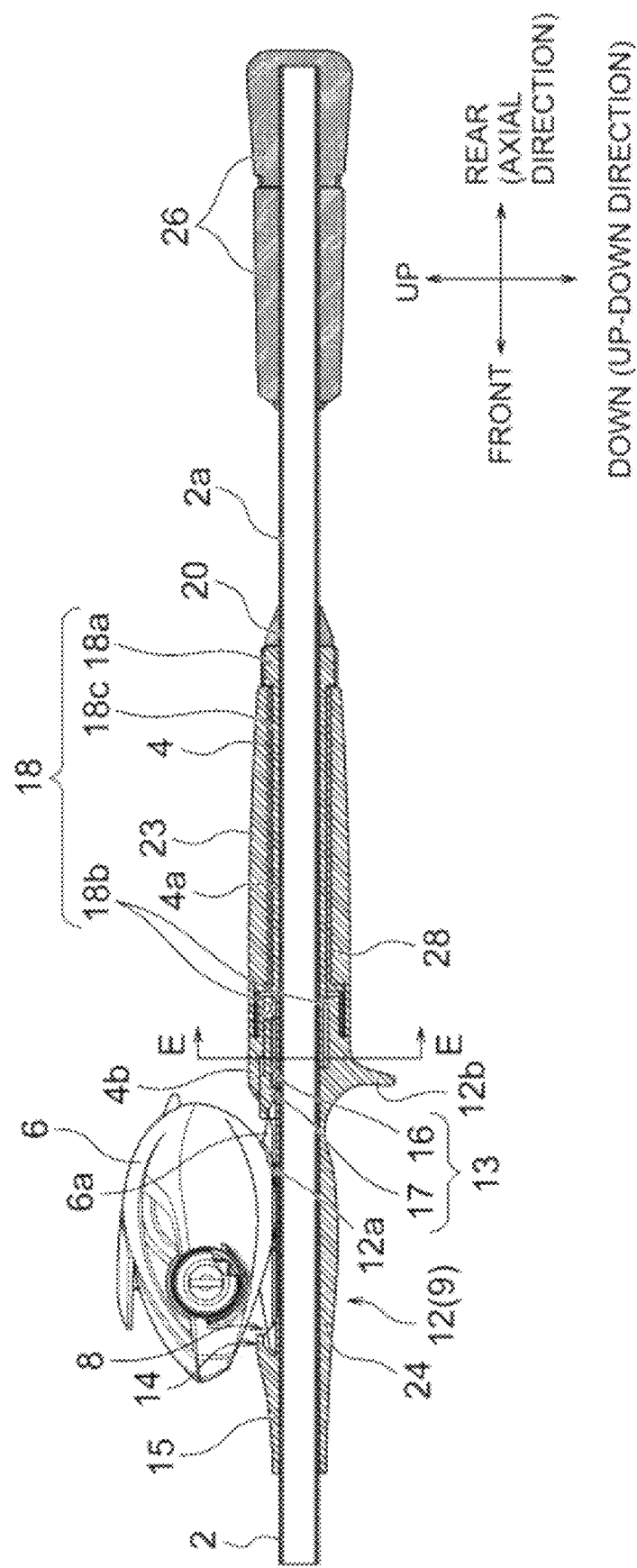
FIG. 9A is a cross-sectional view of a reel seat according to another embodiment of the present invention.
Figure 9B:
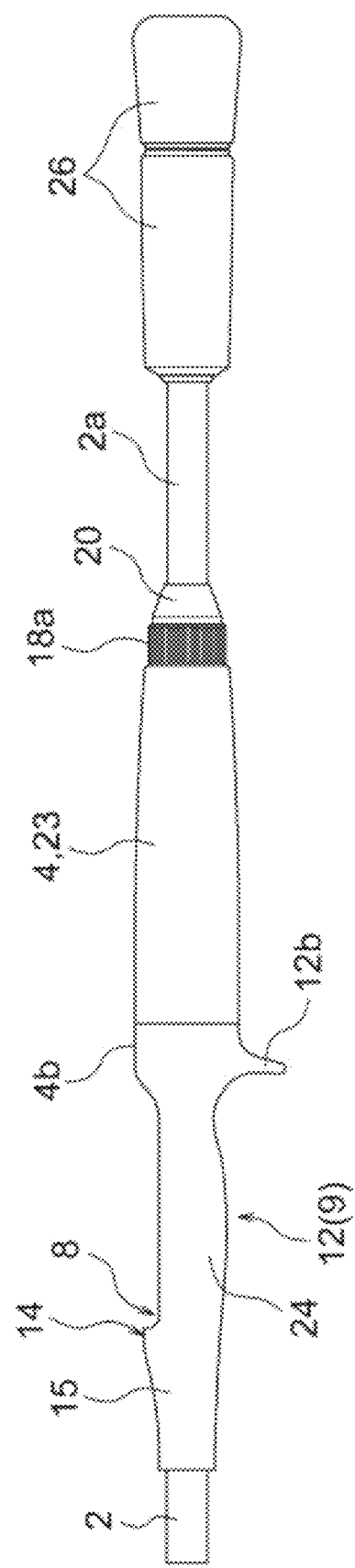
FIG. 9B is a front view of a reel seat according to another embodiment of the present invention.
Figure 9C:
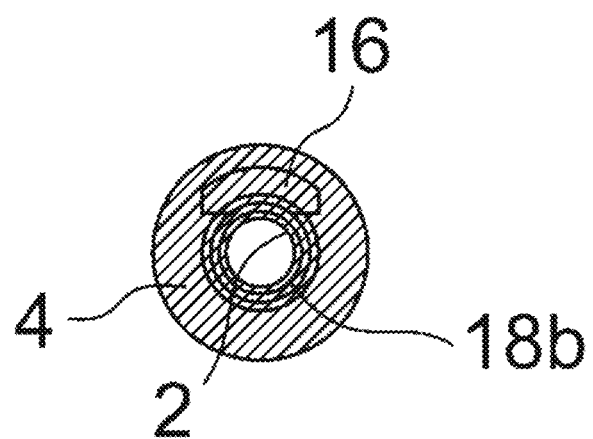
FIG. 9C is a cross-sectional view of the reel seat according to one embodiment of the present invention.

Next, a basic configuration of the reel seat main body 12 and the reel seat 9 in another embodiment will be described with reference to FIG. 9. FIG. 9A is a cross-sectional view of a reel seat according to another embodiment of the present invention (a vertical cross-sectional view of a sheet surface of FIG. 9A passing through a central axis of the reel seat), and FIG. 9B is a front view of the reel seat according to another embodiment of the present invention. FIG. 9C illustrates an E-E cross section of FIG. 9A. In the following description, an axial direction (front-rear direction) and an up-down direction mean directions illustrated in FIG. 9A and a right-left direction (side direction) mean a direction orthogonal to a sheet surface of FIG. 9A. That is, a front side and a rear side means a tip rod side and a proximal end side of the fishing rod, respectively, an upper side means a reel side with respect to an axial center X of a base rod (rod) when a double-bearing reel is attached, and a lower side means an opposite side of the reel side. The axial center X also corresponds to the axial center of the reel seat 9, the reel seat main body 12, the reel leg placing portion 12a, and the tubular portion 4, and these directions can be referred to as any of these axial directions.

The reel seat main body 12 comprises the reel seat main body 12 comprising a reel leg placing surface 12a on which a reel leg 6a of the fishing reel 6 is placed in an axial direction thereof. The reel seat main body 12 can be formed to have a length ranging from 150 mm to 200 mm, for example, but is not limited thereto. In addition, the reel seat main body 12 forms a bulging portion (trigger) 12b that is a slightly bulged portion from the opposite side of the reel leg placing surface 12a and has an easy-to-grip curved outer surface that supports a thenar and an area near the thenar when gripped with a gripping hand. Note that, the rod body may be jointed on a front side of the reel seat main body 12.

The reel leg placing surface 12a of the reel seat main body 12 can be formed flat or substantially flat with a larger curvature than that of other sites in a circumferential direction (for example, the trigger 12b) adjacent to the reel leg placing surface 12a of the reel seat main body 12, and is formed to extend in the axial direction of the reel seat main body 12 illustrated in FIG. 2. A fixed hood 14 is integrally disposed on one end (rod tip side) of the reel seat main body 12. One end of the reel leg placing surface 12a of the reel seat main body 12 is disposed inside the fixed hood 14.

The reel seat main body 12 of the reel seat 9 comprises a front tubular portion 15 on a front side, and comprises the above-described tubular portion (rear tubular portion) 4 on a rear side, and a grip portion (rear grip) 23 to be gripped and held is fixed to an outer surface of the tubular portion 4. The reel seat main body 12 comprises an intermediate coupling portion 24 that couples the front tubular portion 15 and the tubular portion (rear tubular portion) 4 in the axial direction, and they are integrally formed. A proximal end of the rod body 2 forming the fishing rod is fixed to the inner surface of the front tubular portion 15 by adhesion or the like, a proximal end of the rod butt side rod body 2a forming the fishing rod is fixed to an inner surface of an inner projection 4a formed to protrude along the axial direction on the rear side of the reel seat main body 12 inside the tubular portion 4 by adhesion or the like, and the grip portion 23 is fixed to the outer peripheral surface of the tubular portion 4 and is configured to be flush with a surface of a tubular end 4b.

The movable hood 13 is attached to the other end (rod base side) of the reel seat main body 12 so as to be movable in the axial direction. The fishing reel 6 is attached and fixed to the reel seat 9 by placing the reel leg 6a on the reel leg placing portion 12a and fastening a rear end side thereof by the movable hood 13 moving in the axial direction in a state in which a front end side thereof is fitted in the fixed hood 14. Note that, the reel seat 9 comprises the reel seat main body 12 and the movable hood 13, but may comprise other members.

The movable hood 13 comprises the engaging portion 16 in which a male screw portion is formed, and the hood portion 17 curved radially inward to accommodate at least a part of the reel leg 6a. The hood portion 17 is disposed so as to enter an opening 8 formed below a rear end face of the intermediate coupling portion 24 (the vicinity of the tubular end 4b), and the opening 8 is connected to the reel leg placing portion 12a. That is, when the movable hood 13 moves forward, the hood portion 17 thereof is fitted in a rear end of the reel leg 6a placed on the reel leg placing portion 12a in the opening 8.

The male screw portion of the engaging portion 16 of the movable hood 13 is screwed with a female screw portion formed in the engaged portion 18b formed on an inner surface of the nut member 18 provided inside the tubular portion 4. That is, when the operating part 18a of the nut member 18 is rotationally operated in one direction, the movable hood 13 moves to the front side in the axial direction to fasten the rear end side of the reel leg 6a (attached and fixed state of the reel), and when the nut member 18 is rotationally operated in the other direction, the movable hood 13 moves to the rear side in the axial direction to release the rear end side of the reel leg 6a (detached state of the reel). Here, various methods known conventionally are possible as a method of engaging the engaging portion 16 with the engaged portion 18b, and the method is not limited to a specific mode (screwing). By providing a stopper member 20 on the rear end side of the operating part 18a, it is possible to restrict the operating part 18a so as not to come off to the rear side.

The rod body 2 is provided on the inner surface of the nut member 18, and a pipe member 28 is provided on the outer surface of the nut member 18. The grip portion (rear grip) 23 is attached to the outer surface of the pipe member 28. At this time, the grip portion (rear grip) 23 may be attached so as to be screwed to the outer surface of the pipe member 28, or may be attached by an adhesive. The modes of the movable hood 13 and the nut member 18 are as described with reference to FIGS. 2 to 8, and the same applies to the present embodiment basically. Therefore, further details are omitted.

Next, a cross-sectional structure of the reel seat 9 according to one embodiment of the present invention will be described with reference to FIG. 9C. FIG. 9C illustrates an E-E cross section of FIG. 9A. As illustrated in the drawing, in the reel seat 9 according to one embodiment of the present invention, in a state in which the rod butt side rod body 2a is inserted (and in a case where the movable hood 13 is at the position of FIG. 9B), the rod body 2, the engaged portion 18b, the engaging portion 16, and the tubular end 4b are provided in order from the inner side when the cross section perpendicular to the axial direction of the tubular end 4b is seen in a downward direction from the central axis of the tubular end 4b (the downward direction in the up-down direction of the sheet surface of FIG. 9C), and the rod body 2, the engaged portion 18b, and the tubular end 4b are provided in order from the inner side when the cross section perpendicular to the axial direction of the tubular end 4b is seen in an upward direction from the central axis of the tubular end 4b (the upward direction in the up-down direction of the sheet surface of FIG. 9C). Various shapes of the inner side of the tubular end 4b are possible depending on the shape of the engaging portion 16, and are not limited to a specific mode.

A fishing rod 1 according to one embodiment of the present invention comprises the reel seat 9 according to any one of the above descriptions; and a rod body (the rod body 2 and the rod butt side rod body 2). Note that the rod butt side grip portion 26 may be formed on the rod butt side end of the rod butt side rod body 2a, and in this case, the rod body can be configured to comprise the rod butt side grip portion 26.

According to the fishing rod according to one embodiment of the present invention, it is possible to provide a fishing rod comprising the reel seat capable of stably maintaining a fixed state of a reel to the reel seat by preventing a hand or a finger from touching an operating member for fixing a reel leg to the reel seat when the reel is gripped or during a casting operation, even in a case where a structure in which a position of a reel leg placing portion of the reel seat is offset in a direction of falling down with respect to an axial center of a base rod is adopted. More specifically, the reel leg placing portion 12a and the operating part 18a can be formed sufficiently apart from each other by interposing the connecting portion 18c for providing a distance between the engaged portion 18b of the nut member 18 and the operating part 18a and providing the operating part 18a on the rod butt side of a grip portion 23 to be described later, so that it is possible to maintain the fixed state of the reel 6 to the reel seat 9 for a long time by not touching the operating member for fixing the reel leg to the reel seat when the reel is gripped or during the casting operation with a hand or a finger or greatly reducing the possibility.

Here, in the reel seat 9 according to one embodiment of the present invention, the reel seat main body 12 can be formed of carbon fiber reinforced plastic (CFRP), glass reinforced plastic (GFRP), Al, or Mg. The reel seat main body 12 may be formed of a material such as GFRTP (continuous fiber), GFRTP (discontinuous fiber), CFRTP (continuous fiber), CFRTP (discontinuous fiber), or a hybrid. By forming the reel seat using such a material, it is possible to suppress an increase in weight while ensuring sufficient rigidity and strength.

Dimensions, materials, and arrangements of the components described in the present specification are not limited to those explicitly described in the embodiments, and the components may be modified to have any dimensions, materials, and arrangements that may fall within the scope of the present invention. In addition, components not explicitly described in the present specification can also be added to the described embodiments, or some of the components described in each of the embodiments can be omitted.

REFERENCE SIGNS LIST

1 Fishing rod
2 Rod body
2a Rod butt side rod body
3 Base rod
4 Tubular portion (rear tubular portion)
4a Inner projection
4b Tubular end
5 Middle rod
6 Reel
6a Reel leg
7 Tip rod
8 Opening
9 Reel seat
10 Fishing line guide
12 Reel seat main body
12a Reel leg placing surface
13 Movable hood
14 Fixed hood
15 Front tubular portion
16 Engaging portion
17 Hood portion
18 Nut member
18a Operating part
18b Engaged portion
18c Connecting portion
19 Intermediate connecting portion
20 Stopper member
23 Grip portion (rear grip)
24 Intermediate coupling portion
26 Rod butt side grip portion
27 Spacer member
28 Pipe member

The invention claimed is:

1. A reel seat that is attached to a rod body, the reel seat comprising: a reel seat main body comprising a reel leg placing portion on which a reel leg is placed, a fixed hood provided on a front side in an axial direction of the reel leg placing portion, and a tubular portion provided on a rear side in the axial direction of the reel leg placing portion; a movable hood provided on the rear side in the axial direction of the reel leg placing portion; and a cylindrical nut member provided on an inner side of the tubular portion and enabling movement of the movable hood by rotation, wherein
the movable hood comprises an engaging portion that is provided on an inner side of the tubular portion, and a hood portion that accommodates at least a part of the reel leg,
the nut member comprises an operating part that protrudes outward in the axial direction from an end on the rear side in the axial direction of the tubular portion and operates a radially outer surface of the cylindrical nut member to enable rotation of the cylindrical nut member, an engaged portion that is provided to be relatively rotatable with respect to the tubular portion and has an inner surface or an outer surface seen in a radial direction of the cylindrical nut member engaging with the engaging portion, and a connecting portion that connects the operating part and the engaged portion, and
the movable hood is movable to the front side in the axial direction by rotation of the nut member by operation of the operating part.

2. The reel seat according to claim 1, wherein
the engaging portion and the nut member are screwed with each other.

3. The reel seat according to claim 1, wherein
a grip portion is provided on an outer surface of the tubular portion.

4. The reel seat according to claim 3, wherein
an end on the rear side in the axial direction of the grip portion is provided between the end on the rear side in the axial direction of the tubular portion and the operating part of the nut member as seen in the axial direction of the reel leg placing portion.

5. The reel seat according to claim 1, wherein
the rod body is insertable into the tubular portion from the rear side in the axial direction.

6. The reel seat according to claim 5, wherein
a spacer member is provided between an inner surface of the nut member and an outer surface of the rod body.

7. The reel seat according to claim 1, wherein
a stopper member is provided at an end on the rear side in the axial direction of the operating part of the nut member.

8. The reel seat according to claim 1, wherein
in a state in which the rod body is inserted, the rod body, the engaged portion, and the tubular portion are provided in order from an inner side as seen in a downward direction from a central axis of the tubular portion in a cross section perpendicular to an axial direction of the reel leg placing portion.

9. The reel seat according to claim 1, wherein
the engaging portion, the engaged portion, and the tubular portion are provided in order from an inner side as seen in a downward direction from a central axis of the tubular portion in a cross section perpendicular to an axial direction of the reel leg placing portion.

10. The reel seat according to claim 1, wherein
the engaging portion is formed into an arc shape as seen in a cross section perpendicular to an axial direction of the reel leg placing portion.

11. The reel seat according to claim 10, wherein
an angle of an arc of the arc shape ranges from 70 degrees to 140 degrees.

12. The reel seat according to claim 1, wherein
the rod body is attached by being inserted through some or all of the reel seat.

13. A fishing rod comprising the reel seat according to claim 1; and a rod body.

\* \* \* \* \*